(12) United States Patent
Meier et al.

(10) Patent No.: US 11,318,798 B2
(45) Date of Patent: May 3, 2022

(54) WHEEL WITH A TIRE RETAINING DEVICE FOR A RACING BICYCLE

(71) Applicant: DT SWISS INC., Grand Junction, CO (US)

(72) Inventors: Matthias Meier, Nidau (CH); Paul Schuler, Munich (DE); Andreas Tschanz, Lengnau (CH); Martin Walthert, Aarberg (CH)

(73) Assignee: DT SWISS INC., Grand Junction, CO (US)

( * ) Notice: Subject to any disclaimer, the term of this patent is extended or adjusted under 35 U.S.C. 154(b) by 327 days.

(21) Appl. No.: 16/101,854

(22) Filed: Aug. 13, 2018

(65) Prior Publication Data

US 2019/0047333 A1    Feb. 14, 2019

(30) Foreign Application Priority Data

Aug. 11, 2017 (DE) .......................... 102017118415.5

(51) Int. Cl.
*B60C 17/06* (2006.01)
*B60C 17/04* (2006.01)
*B60C 15/028* (2006.01)

(52) U.S. Cl.
CPC .......... *B60C 17/041* (2013.01); *B60C 15/028* (2013.01); *B60C 17/06* (2013.01); *B60C 2200/12* (2013.01)

(58) Field of Classification Search
CPC ... B60C 17/065; B60C 17/06; B60C 2200/12; B60C 15/028
See application file for complete search history.

(56) References Cited

U.S. PATENT DOCUMENTS

| 779,505 A |  | 1/1905 | Stein |
|---|---|---|---|
| 796,664 A | * | 8/1905 | De Laski .............. B60C 15/028 |
|  |  |  | 152/401 |

(Continued)

FOREIGN PATENT DOCUMENTS

| EP |  | 2682287 A1 |  | 1/2014 |  |
|---|---|---|---|---|---|
| FR |  | 385879 A | * | 5/1908 | ........... B60C 15/028 |

(Continued)

OTHER PUBLICATIONS

German Search Report from German Patent Application No. 10 2017 118 415.5, dated Jul. 18, 2018.

*Primary Examiner* — Timothy Kennedy
*Assistant Examiner* — Farah Taufiq
(74) *Attorney, Agent, or Firm* — Greer, Burns & Crain, Ltd

(57) ABSTRACT

A wheel for a racing bicycle including a rim with a rim body having a rim well and lateral rim flanks provided with rim flanges, the rim flanges showing bulges protruding inwardly, each defining an undercut at the pertaining rim flange. A tire with two circumferential tire beads is accommodated on the rim body between the rim flanges, the tire beads bearing against the inside of the rim flanges and entering the undercut at the bulges of the rim flanges. A tire retaining device is included which is disposed in the internal space between the tire and the rim well. The tire retaining device includes an insert member having a hollow space that extends between the tire beads and contains a radially outwardly peripheral wall and a radially inwardly peripheral wall, wherein at least the radially inwardly peripheral wall extends continuously across an inner axial width of the insert member.

18 Claims, 3 Drawing Sheets

(56) References Cited

U.S. PATENT DOCUMENTS

| | | | | |
|---|---|---|---|---|
| 817,668 | A | * | 4/1906 | Raymond ............. B60C 15/028 |
| | | | | 152/401 |
| 898,057 | A | * | 9/1908 | Meixell ................. B60C 15/028 |
| | | | | 152/401 |
| 1,562,287 | A | * | 11/1925 | Bunce ................... B60C 15/028 |
| | | | | 301/64.303 |
| 1,614,286 | A | | 1/1927 | Cullen |
| 2,109,383 | A | | 2/1938 | Gallardo |
| 3,485,283 | A | | 12/1969 | Brehmer et al. |
| 4,016,917 | A | | 4/1977 | Victor |
| 4,183,388 | A | * | 1/1980 | Cassidy .................. B60C 17/01 |
| | | | | 152/158 |
| 4,681,147 | A | * | 7/1987 | Hugele ................. B60C 17/041 |
| | | | | 152/158 |
| 9,283,815 | B2 | | 3/2016 | Watarai |
| 2001/0042579 | A1 | * | 11/2001 | Lacombe ................ B60B 1/003 |
| | | | | 152/379.5 |
| 2006/0060283 | A1 | | 3/2006 | Chen |
| 2010/0270097 | A1 | * | 10/2010 | Prakash ................... B60K 6/12 |
| | | | | 180/165 |
| 2011/0126954 | A1 | | 6/2011 | Glazebrook |
| 2014/0007998 | A1 | * | 1/2014 | Watarai ................. B60C 15/028 |
| | | | | 152/379.5 |
| 2015/0360511 | A1 | | 12/2015 | Teixeira |

FOREIGN PATENT DOCUMENTS

| | | | | |
|---|---|---|---|---|
| GB | 1476506 | A | * 6/1977 | ............. B60B 21/12 |
| GB | 2191453 | A | 12/1987 | |
| JP | S63199107 | A | 8/1988 | |
| JP | 2004075039 | A | * 3/2004 | ............. B60C 17/06 |

\* cited by examiner

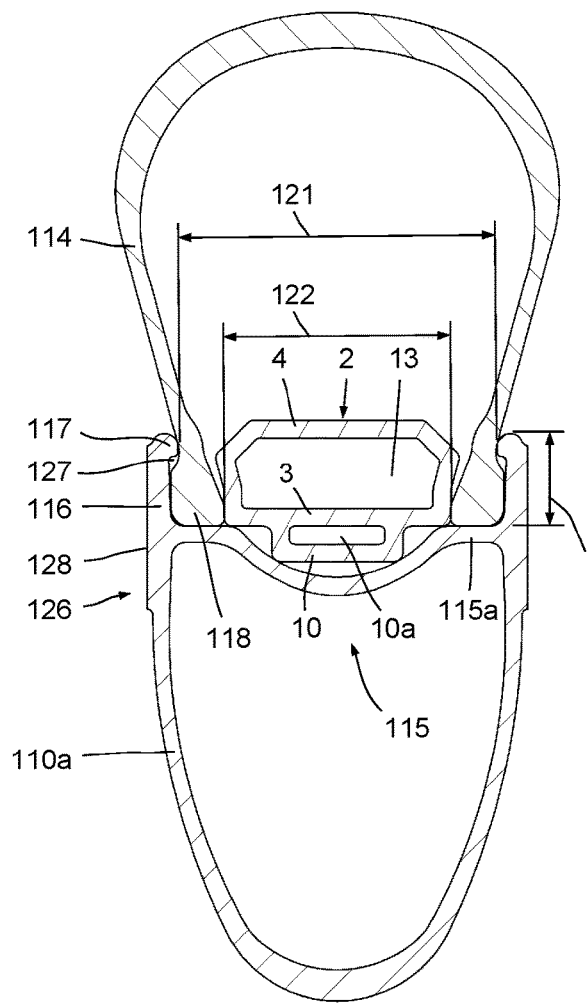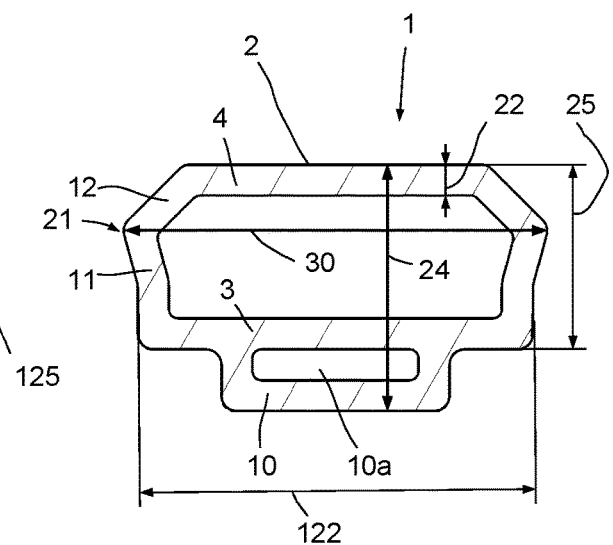
Fig. 3a                              Fig. 3b
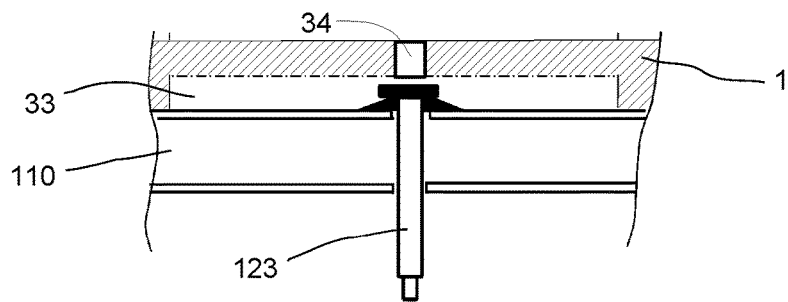
Fig. 4

WHEEL WITH A TIRE RETAINING DEVICE FOR A RACING BICYCLE

BACKGROUND

The present invention relates to a wheel having a tire retaining device for a sports racing bicycle which is in particular also suitable for professional use.

As a rule, professional racing cyclists use wheels having tubeless tires glued onto the outside of the wheel rims. This ensures a safe seat of the tire on the rim. In the case of air escaping from the tire during a race the cyclist can still continue riding for a certain distance even on the flat tire since the tire is safely glued onto the rim. Although the riding conditions are poorer overall it makes sense to use the interval until the service truck arrives to then change wheels.

This function is basically desirable for rims of racing bicycles having rim flanges and using tubeless tires with tire beads which are pressed against the lateral rim flanges due to the tire inflation pressure. If the pressure drops within a very short time due to a suddenly forming hole or tear, then the lateral support of the racing tire tube decreases accordingly. This may result in the racing tire tube detaching from the very narrow racing wheel rim. Racing wheel rims show an axial width between ca. 15 mm (millimeters) and 25 mm, usually only about 20 mm. This width is not sufficient for preventing the bead tire from detaching from the racing wheel rim. Therefore, the cyclist riding this racing bicycle must stop quickly in case of pressure loss in the bead tire to prevent a conceivable accident. Professional racing cyclists therefore tend to use the aforementioned wheels with tubeless tires glued onto the outside of the wheel rim.

The situation is entirely different for mountainbikes, since they use considerably wider rims. Their rims may show twice the width or more compared to racing bicycles. In the field of mountainbikes there is thus considerably less risk of a tire detaching even if air escapes. Here there is a higher risk of permanent damage to the tire body following a puncture after pressure loss if the tire body gets pinched between the rim flange and the ground. To prevent damage to the tire due to punctures a system for mountainbikes has been disclosed where a flat and wide strip of plastic foam is inserted into the internal space between the tire and the rim when mounting the tire. In the case of sudden pressure loss, the foam dampens the radial action of force onto the outer tire cover to thus avoid damage to the outer cover even in the case of puncture due to jumps or obstacles. The large width of the rim allows mounting onto mountainbikes since sufficient internal space is available.

In mountainbikes, the radially inwardly region of the space between the rim and the tire may be completely filled with foamed material for example up to half the radial height. In the case of a flat tire, this allows to enable the user to continue riding on the comparatively thick foam layer. Its disadvantage is the comparatively high weight. Another drawback is that changing tires gets more difficult since the radially inwardly portion of the internal space is filled with foam.

All these mountainbike systems allow first time mounting since the rims show a large rim width. In the field of racing bicycles, the much smaller rim width provides for considerably less mounting space. At any rate, all these systems are far too heavy for professional use of racing bicycles.

Various measures have been disclosed for motor vehicles and other vehicles to secure a tire on a rim for example of a motor vehicle. Here the weight is virtually irrelevant. Thus, for example U.S. Pat. No. 4,016,917 shows a wheel for a motor vehicle having a number of tire bead clamps spaced over the circumference secured by bolts through the rim with the screw nuts remaining visible on the inside of the rim. This system with tire bead clamps is basically functional. However, different dimensions and different requirements render this system unsuitable for securing a racing bicycle tire. The tire bead clamps are far too heavy and the screw nuts on the inner rim lead to unfavorable air flow conditions so that the aerodynamic drag would be far too high for racing bicycles. In racing bicycles, each gram of weight counts and negative changes to the flow resistance are as a rule unacceptable.

U.S. Pat. No. 779,505 dating from 1905 discloses a wheel rim with a tire for vehicles employing security shoes which are in turn attached to the inner peripheral surface of the rim by means of wing screws. This system is again unsuitable for use on racing bicycles already because the air drag and also the weight are far too high.

U.S. Pat. No. 2,109,383 discloses a tube tire with the tire interior filled with a mixture of fine granular material and air to avoid endangerment if a tire bursts. The tire bead may be secured to the rim by means of a band. The tire filled with bulk material is far too heavy for use with a racing bicycle.

U.S. Pat. No. 1,614,286 shows a wheel with a rim and an inner tube with the rim flanges bent axially outwardly. An annular, massive member having two peripheral flanges extending axially outwardly and tapering outwardly is disposed between the tire beads to form-fittingly secure the tire beads on the rim. The peripheral annular member shows a considerable weight so that this system cannot be used with a modern racing bicycle.

U.S. Pat. No. 4,681,147 discloses wheels for motor vehicles, trucks, farm tractors and armored vehicles with a safety device disposed on the rim between the tire beads, the weight of which being between 60 and 70% of the tire weight. This system is thus too heavy for use with racing bicycles. In racing bicycles for sports and professional cycling each gram of weight counts.

U.S. Pat. No. 9,283,815 B2 discloses a bicycle tire with a tire retainer attached to the rim between the tire beads to retain the tire on the rim. The tire retainer is T-shaped in cross-section and extends radially far outwardly from the rim well. At the radially outwardly ends peripheral projections extend in both axial directions, extending axially beyond the rim flanges. In the case of pressure loss, these peripheral projections exert pressure on the tire beads from above, urging the tire retainer and the tire beads against the rim well. In one embodiment, the tire retainer closely bears against the tire beads in the radially inwardly region while it may show a minimum distance in another configuration. Although this system is basically functional the peripheral tire retainer with the axial projections gives it a large volume and heavy weight and thus renders it unsuitable for racing bicycles in the field of competitive sports.

EP 2 955 033 B1 has disclosed a vehicle wheel for use with a mountainbike where a bead lock is positioned in the rim trough between the tire beads. The bead lock comprises a band and two free ends movable relative to each other. An actuator accessible from outside the rim allows tightening of the band so as to bring the bead lock to the desired locked position in the rim trough. The band consists of a resilient material such as spring steel or of a plastic and it is solid and circumferential in design. Thus, the circumferential band shows a considerable weight which may just seem tolerable for use with mountainbikes but makes it unsuitable for use in racing bicycles in amateur competitive sports or in professional competitions.

It is therefore the object of the present invention to provide a wheel having a lightweight tire retaining device for a racing bicycle and in particular for a racing bicycle for sports or semi-professional or professional bicycle racing for the user to continue riding the racing bicycle even in the case of pressure loss for example at least until the service truck arrives. This is intended to achieve in particular a reliable function involving little additional weight. Negative impact on aerodynamics is sought to be largely or entirely avoided.

SUMMARY

A wheel according to the invention for a racing bicycle in particular for a racing bicycle for professional bike racing comprises a rim with a rim body which includes a rim well and lateral rim flanks provided with rim flanges. The rim flanges preferably show bulges protruding inwardly each defining an undercut at the pertaining rim flange. A tire having two circumferential tire beads is accommodated on the rim body between the rim flanges. When operational or when mounted as provided the tire beads bear against the inside of the rim flanges. If bulges and undercuts are provided the tire beads preferably enter the undercuts at the bulges of the rim flanges. At least one tire retaining device is comprised and disposed in the internal space between the tire and the rim well. The tire retaining device comprises at least one insert member having at least one cavity extending between the tire beads (or disposed in-between) and a radially outwardly peripheral wall and a radially inwardly peripheral wall. At least the radially inwardly peripheral wall extends continuously across an inner axial width of the insert member. The hollow space is enclosed in particular radially inwardly through the radially inwardly peripheral wall and radially outwardly, through the radially outwardly peripheral wall. The radially inwardly peripheral wall preferably extends at about the height of the rim shoulder between the tire beads and may bear against the tire beads on one or both sides. It is possible for the radially inwardly peripheral wall and the tire beads to extend between the rim flanges without any gap. The hollow space is configured closed at least in sections in particular about its longitudinal axis.

The wheel according to the invention has many advantages. A considerable advantage is that the tire retaining device can secure the tire on the rim of a professional racing bicycle even if sudden pressure loss occurs during a ride. The user may ride at least a short distance of a few 100 meters or even a few kilometers until the service truck arrives for changing tires or wheels. Thus, even wheels having rims with rim flanges allow to continue racing involving no (substantial) delay even with a flat tire, although the cyclist must slightly reduce his speed. What is advantageous is the radially inwardly peripheral wall which enables a reliable axial support of one tire bead or both tire beads in case they move axially inwardly.

The radially inwardly peripheral wall enables a comparatively rigid configuration capable of bearing and discharging considerable axial forces. This rod-like construction can bear and discharge relatively large compressive forces. A slotted construction having no continuous radially inwardly peripheral wall can transmit considerably lower axial forces or it would have to be made of a considerably heavier and more stable material to achieve the same effect. This is not feasible if the weight of the insert member must remain low and e.g. below 30 g or below 20 g.

The hollow space in the interior of the insert member enables a considerable advantage. High weight reduction can be achieved while offering the same or comparable effect. A considerably reduced wall thickness at noticeably reduced weight can be realized. Stability will not be reduced due to the structure. The wall thickness is provided in places where it shows effect.

A radially inwardly peripheral wall and a radially outwardly peripheral wall are in particular configured so as to extend continuously at least over nearly the entire given axial width of the insert member. Preferably, the radially inwardly peripheral wall and the radially outwardly peripheral wall are each directly adjacent to the hollow space. This achieves high rigidity in the axial direction. The insert member particularly preferably consists of a resilient material that compresses under pressure. Thus, as the tire bead is increasingly displaced axially inwardly the counterpressure by the insert member increases.

Due to the lightweight construction the insert member need not be multipart and provided for inserting in specific angular positions for saving weight. The insert member may be, and preferably is, circumferential in design. The tire retaining device weight is preferably less than 30 g (grams) and in particular less than 20 g. In particularly preferred configurations the entire weight of the tire retaining device and/or of the insert member lies between 5 g and 15 g. Preferably the tire retaining device weighs less than 10% of the tire weight and preferably it may be less than 8% or 6% or even less than 5% of the tire weight. The total weight of a wheel is in particular less than 1700 g and preferably less than 1500 g and particularly preferably less than 1200 g. A front wheel, alternately a rear wheel may weigh less than 1000 g including the rim, hub, spokes, tire and tire retaining device. The proportion of the tire retaining device to the total weight is preferably below 2% and it may in particular be as little as 1.5% or even only 1%.

The insert member may be referred to as safety component and it is preferably configured circumferentially and may show two ends connected with one another. The rim flanges and in particular their (axially) outer surfaces are particularly preferably substantially radial and in particular radially oriented. Preferably the outer surfaces of the rim flanges are aligned parallel to one another. The outer surfaces of the rim flanges may preferably provide brake flanks or brake contact surfaces.

The insert member may comprise one or more safety components.

The tire retaining device provides emergency running properties for the racing bicycle wheel even in case of pressure loss in the tire for distances of a few hundred or a few thousand meters.

In preferred specific embodiments, the insert member bears against at least one of the tire beads at least in some spots. It is possible and preferred for the insert member to completely bear against one and in particular against both tire beads after proper assembly. Preferably, the insert member bears against at least one of the tire beads and in particular against both the tire beads over the radial height of the radially inwardly peripheral wall at least in spots and in particular substantially across the entire surface. In preferred configurations, after proper assembly the insert member and in particular at least the radially inwardly peripheral wall is resiliently compressed in the axial direction so that the insert member biases the tire beads axially outwardly.

In other configurations, the insert member is preferably spaced apart at least in sections, alternately entirely, from at least one of the tire beads and in particular from both the tire beads. Proper functioning does not necessarily require for the insert member to bear against any of the tire beads after proper mounting and during proper use (absent any pressure loss). An axial distance of the insert member from any of the tire beads, alternately from both tire beads, may be large and in particular larger than an axial overlap of the tire bead and the bulges at the rim flange. The axial distance may in particular be larger than an axial undercut dimension or even larger than double the axial undercut extension. This means that these configurations allow in theory, absent external loads and absent excess air pressure in the tire, to pull off a tire bead radially outwardly without causing contact with the insert member of the tire retaining device. Reliable function may already be provided if not any and all axial tire bead displacement is prevented but only extreme axial displacement is. Extreme axial displacement is a displacement involving the considerable risk of the tire detaching from the rim or the racing wheel rim. Therefore, the insert member and the tire bead must not necessarily show a minimal or no distance in-between. This is a considerable difference from conventional safety systems which are provided to prohibit even minor axial displacement.

In preferred configurations, the insert member extends radially outwardly beyond the rim flanges when properly mounted. Particularly preferably the properly mounted or properly installed insert member extends radially outwardly beyond the rim flanges (only) by less than ⅓ and in particular less than ¼ of its radial height. It is also possible for the insert member to extend outwardly beyond the outer end of the rim flanges by less than half the radial height. The radial height of the insert member is in particular measured on the basis of the radial height of the insert member between the outer surfaces of the radially inwardly peripheral wall and the radially outwardly peripheral wall. For example, if the insert member shows one or more support sections on the radially inwardly peripheral surface to rest on the rim well then their radial heights are preferably not taken into account.

In preferred specific embodiments, the properly installed insert member radially protrudes less than 2 mm beyond the rim flanges. This enables a very compact structure and thus a low total weight. The fact that the tire retaining device is effective mainly in the region of the tire beads within the height of the rim flanges provides for an effective and lightweight tire retaining device so as to provide a lightweight wheel for a racing bicycle.

In preferred specific embodiments, the hollow space in the properly installed insert member (after mounting) radially protrudes less than 1 mm or not at all beyond the rim flanges. This provides for a particularly compact design in which only the (single) radial wall thickness of the radially outwardly peripheral wall may radially protrude beyond the outwardly ends of the rim flanges. A certain small radial protrusion is preferred so that in case of pressure loss a radial load is applied on the radially outwardly peripheral wall and the insert member applies an axial force on the tire beads.

In all the configurations, it is preferred for the insert member to comprise side walls which are oriented at angles to one another at least in sections. The insert member in particular shows on each of the axial sides two (or more) side walls angled to one another. On the whole the cross-section of the insert member may show a substantially rectangular shape. Taking into account angled side walls the resulting cross sectional design may substantially be hexagonal or octagonal or the like.

In advantageous configurations, the radially outwardly peripheral wall of the insert member is substantially cylindrical. The radially outwardly peripheral wall may be designated a cover wall. Preferably (substantially) no insert member components are located radially outside the radially outwardly peripheral wall. A cylindrical radially outwardly cover wall offers good support in the axial direction and enables a lightweight while still relatively very rigid configuration.

In all the configurations, it is preferred for the hollow space in the insert member to comprise at least ⅓ or at least ½ of the insert member body volume. The portion of the cross-sectional area of the hollow space is in particular at least ⅓ and in particular at least ½ of a representative cross-sectional area of the insert member. This provides for simple and also very lightweight and very stable inserts.

In preferred specific embodiments, at least a substantial part of the insert member walls shows a wall thickness of less than 2.5 mm and in particular less than 2 mm and particularly preferably less than 1.5 mm. Wall thicknesses of 1 mm (+/−20%) are preferred.

Preferably, the insert member cross section profile is substantially rectangular. The insert member and/or the hollow space may preferably show a cross-section whose transverse extension in a radially central region is larger than in a radially inner and/or radially outer region, such as in the case of a rounded or polygonal hollow space cross-section or in the case of a hexagonal or octagonal hollow space. This enables a stable and lightweight structure.

It is possible for the hollow space to show one or more outwardly openings. This enables pressure compensation from the interior of the hollow space to the internal space between the tire and the rim.

In all the configurations, the insert member may comprise at least two or more hollow spaces. For example, two annular hollow spaces may be provided separated from one another by an annular partition wall.

In preferred specific embodiments, the insert member comprises at least one support section oriented toward the rim well. The support section may serve as a support on the rim well. The support section may show a solid support body, alternately for example two entirely or partially circumferential lugs protruding inwardly. The support section may serve for centering by the circumferential groove in the rim well or by the rim well per se. Alternately, it is possible for a support section to show a hollow space for weight reduction.

In preferred specific embodiments, the insert member may show a T-shaped cross-section at least in portions. Then, the support section preferably forms the radial part and the body section with the radially inwardly peripheral wall and the radially outwardly peripheral wall form the transverse section.

In all the configurations, the wheel preferably shows a width between the rim flanges and in particular between the bulges between 14 mm and 30 mm and preferably between 15 mm and 25 mm and a height of the rim flanges above the rim well and in particular above the rim shoulder of between 4 mm and 10 mm. The height of the rim flanges above the rim shoulder is in particular between 4.5 and 6 mm. The width of the bulge is preferably less than 1.5 mm and in particular less than 1 mm. The circumferential depression in the rim base preferably shows a height between 2.5 mm and 3 mm. The tire beads preferably rest on the lateral rim shoulders. Between the rim shoulders there is the circumferential depression which is in particular configured as a circumferential groove and may be referred to as a rim trough.

The outer diameter of the rim is preferably between 595 mm and 633 mm (+/−10 mm).

In all the configurations, it is preferred for the tire to be a tubeless tire with tire beads. It is likewise particularly preferred for the rim to be a hollow rim. A hollow space is preferably configured between the rim well, the lateral rim flanks and a rim base which may optionally be configured between the radially inwardly ends of the rim flanks. The rim base may be very narrow or virtually nonexistent depending on the angle of the rim flanks.

It is possible and preferred for the insert member to comprise a number of segments arranged over the circumference of the rim. It is possible for evenly spaced punched holes or cuts to be configured in the insert member from radially outwardly and/or inwardly. The insert member may show two ends which are connected with or glued to one another during mounting to form a ring.

The insert member is in particular resilient and may at least partially consist of foam or a closed-cell foam or of plastic. In all the configurations, it is possible for the insert member to be (in particular detachably) attached to the rim well of the rim.

In all the configurations, it is preferred for the insert member to urge the tire against at least one rim flange (substantially axially) from the inside at least over a portion if during proper use the tire should deform considerably.

In the normal operating state, the insert member is spaced from the tire in particular at the height of the radially outwardly ends of the rim flanges.

In all the configurations, the insert member may on the whole be configured as a toroidal body comprising in its interior one single hollow space, alternately a number of hollow spaces.

For mounting, a tire bead may first be placed on the rim. Thereafter the insert member may be placed on the rim well. Then, the second tire bead is placed on the rim. Thereafter, the insert member can be manually pressed from outside toward the circumferential depression in the axial center of the rim well.

If pressure loss occurs in operation, the tire retaining device provides for a reliable safeguarding function. If air escapes from the tire interior slowly or abruptly then the tire is compressed on the ground in the supporting area as the rider continues riding, until the tire finally presses on the insert member disposed in the tire interior. Thus, the lateral region of the insert member presses from the inside against the tire beads which thus press against the rim flanges from the inside. This ensures a reliable lateral tire safeguarding. Thus, emergency running properties are provided for the wheel also in the case of pressure loss in the tire. The user may continue riding the bicycle and in particular racing bicycle at least until e.g. the service truck arrives for changing the entire wheel. Thus the time delay is the shortest possible.

The invention is based for example on the following considerations: If no lateral forces act on the tire, then the insert member which is for example of foam must only prevent the tire beads of the flat tire to shift as far as the rim well center following a pressure loss. A higher force acting from the inside on the tire beads is required only if a lateral force acts on the tire from the outside. In riding operation with a bicycle this is as a rule only the case in the area where the tire contacts the ground. This is the area where—due to the deformed flat tire—a vertical force acts on the insert member which is for example of foam. This generates an extension of the cross-section of the insert member if the insert member shows for example a hollow space. In this configuration a number of through holes into the hollow space may provide for pressure compensation when inflating the tire.

To provide a reliable function a sufficiently rigid foam is preferably selected which does not show brittle fracturing properties in use. A combination of different materials is likewise possible. One can for example chose a firm foam for the radially inwardly body portion and a more flexible foam for the radially outwardly body portion. The side walls of a hollow space may for example consist of a flexible foam to ensure deformation of the insert member in the case of an action of force from the outside.

In all the configurations, it is preferred to add a, or at least one, sealant. This ensures a reliable function of the tubeless tire. It is advantageous for the insert member to absorb the smallest amount possible of the sealant which is for example sealing milk. Absorption of low quantities of the sealant requires less sealant so as to lower the total weight required. Tests using a material having a density of ca. 45 kg/cubic meter have shown good test results. The material has absorbed a minor amount of sealant or none at all.

Independently thereof it is particularly advantageous for the sealant to spread largely freely in the tire. One may provide in the radial direction on the outside surfaces of the insert member, notches or cuts or holes. The openings, cuts and notches may also provide pressure compensation between the hollow space of the insert member and the tire interior. It also depends on the material used for the insert member whether pressure compensation is required. If the insert member is reliably air-impermeable given the high air pressures in the tire interior usually used in racing bicycles, pressure compensation may be dispensed with. If apertures are provided in a hollow space in the interior of the insert member, these apertures or through holes or recesses are preferably configured so that the sealant can be discharged out of the hollow space interior. Preferably the through holes are designed such that the sealant does not act as a plug. Discharge of the sealant from the interior of the insert member is preferably reinforced by centrifugal forces.

A wheel according to the invention may optionally be employed in mountainbikes or roadsters or other at least partially muscle-powered bicycles.

BRIEF DESCRIPTION OF THE DRAWINGS

Further advantages and features of the present invention can be taken from the exemplary embodiments which will be discussed below with reference to the enclosed figures.

The figures show in:

FIG. 3*a* a cross-section of another wheel according to the invention of a racing bicycle;

FIG. 3*b* an enlarged detail of FIG. 3*a*;

FIG. 4 a sectional side view of the area of the valve of the embodiment according to FIG. 2 or FIGS. 3*a* and 3*b*;

DETAILED DESCRIPTION

Figure 1:
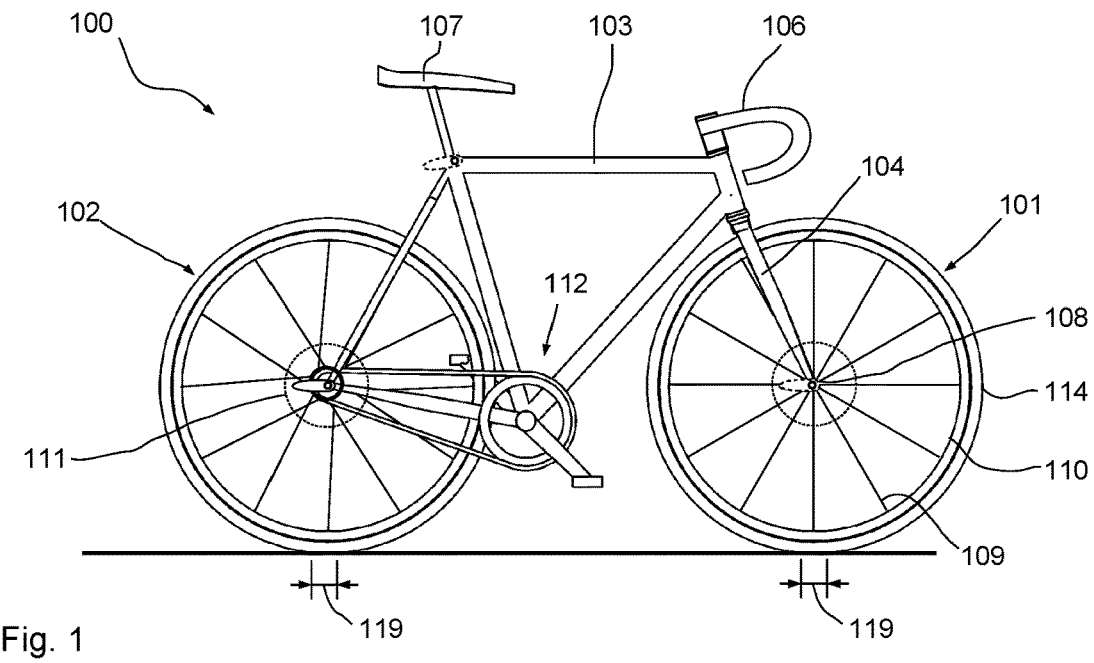
FIG. 1 a schematic side view of a racing bicycle.

FIG. 1 illustrates a racing bicycle 100 equipped with inventive wheels or racing bicycle wheels 101 and 102. The racing bicycle 100 comprises a frame 103, a front wheel fork 104, a handlebar 106 and a saddle 107 and a drive 112. The wheels 101, 102 may be provided with disk brakes 111. The wheels 101, 102 each comprise a hub 108, a rim 110 and spokes 109. A tire 114 is mounted on the rim 110. In proper operation the front wheel and rear wheel tires 114 each contact the ground across a contact area 119. The contact area 119 is in particular shorter than ten times or four times the width of the rim of a wheel 101, 102.

The wheels 101, 102 of the racing bicycle 100 are provided for operation with tubeless tires with tire beads 118. The rims 110 each show a rim flange 116 as can be seen for example in FIG. 2.

Figure 2:
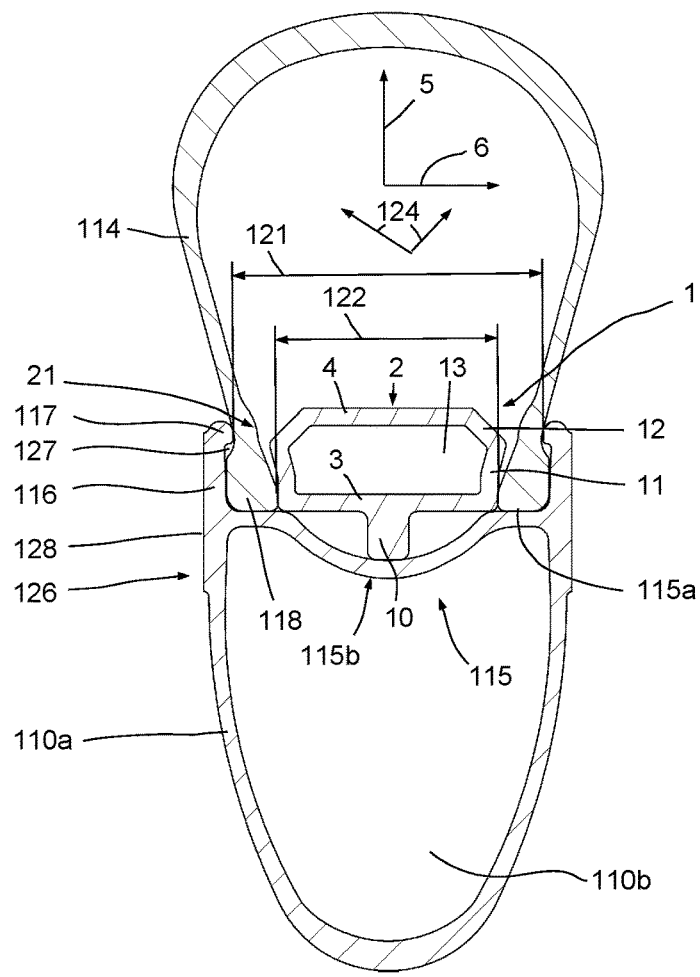
FIG. 2 a cross-section of a wheel according to the invention.

FIG. 2 shows a cross-section of a first embodiment of an inventive wheel 101, 102 with a tire retaining device 1.

The rim 110 comprises a rim body 110a with a hollow space 110b and a rim well 115 and left and right rim flanges 116. A tire 114 is mounted and bears against the rim flanges 116 with its tire beads 118. The interior of the tire bead 118 may be provided with a ring formed by a wire ring or for example carbon fibers or the like.

In the normal operating state with the tire inflated the tire 114 is pushed outwardly due to the air pressure in the tire interior as is indicated by the arrows for the acting force 124.

In the interior of the tire 114 an insert member 2 of a tire retaining device 1 is disposed or attached preferably to the rim well 115. The insert member 1 may be provided with an adhesive layer at the rim-side end on the radial support section 10 for attaching while for example another adhesive layer is applied on the circumferential groove 115b of the rim well 115 to at least adhere the insert member 2 to the rim well. These kinds of adhesive layers do not need to extend over the entire circumference of the rim well 115 and the rim-side end of the radial support section 10 but they may be provided in a few spots only. It is also possible to apply some adhesive layer on the rim-side end of the radial support section 10 to provide for a sufficiently reliable adhesion to the rim well 115. The adhesive layer may be configured such that the insert member 2 may be detached from the rim well 115 using some force without causing damage.

Alternately, it is possible for the insert member 2 to not be provided with an adhesive layer but to remain in the radial vicinity of the rim well 115 for example by way of elastic forces. Alternately, it is possible for the insert member 2 to be positioned during mounting. The insert member may for example show a body length which when not mounted is slightly shorter than the inner periphery of the rim well. Then the insert member 2 is elastically tensioned and retained on the rim well as the ring is closed or its ends are connected.

In this configuration, the insert member 2 comprises a body that is roughly box-shaped or rectangular, showing on its inner radial side a support section 10.

The body of the insert member 2 comprises a radially inwardly peripheral wall 3 and a radially outwardly peripheral wall 4 and on both axial sides, side walls or side wall sections 11, 12 disposed at angles relative to one another. This results in an overall hexagonal cross-section where the inwardly peripheral wall 3 and the outwardly peripheral wall 4 extend in parallel. The largest axial width shows in the intersection point or joint of the side walls 11 and 12.

On the radially inwardly peripheral wall 3 the insert member shows an inner axial width 122 in the axial direction 6 while a clear axial distance 121 between the bulges 117 is dimensioned larger at the rim flanges.

In the exemplary embodiment, the rim beads 118 are accommodated at the undercut 127 and the insert member 2 is form-fittingly disposed between the inner side faces of the tire beads 118. It is also possible to provide (minimal or larger) distances between one tire bead (or both tire beads) and the insert member 2.

The support section 10 is supported on the circumferential depression 115b of the rim well 115. The tire beads 118 each rest on the tire shoulders 115a.

The rim body 110a of the rim 110 is configured as a hollow rim and comprises lateral rim flanks 126 with brake flanks 128 configured in the region of the rim flanges 116.

The interior of the insert member 2 shows a hollow space 13 whose cross-sectional area is larger than ⅓ of the cross-sectional area of the entire insert member 2. The proportion of the cross-sectional area of the hollow space 13 relative to the entire cross-sectional area of the insert member 2 can in particular be more than 50%.

FIG. 3a shows a cross-section of another inventive wheel with the rim body 110a of the rim 110 basically showing the same construction as the rim body 110a in the exemplary embodiment according to FIG. 2. The insert member 2 of the tire retaining device 1 is again basically the same in construction as in the exemplary embodiment according to FIG. 2, although unlike the configuration of FIG. 2 it shows a broader radial support section 10 which comprises an additional hollow space 10a in its interior. The broader configuration of the support section 10 allows the support section 10 to rest on the lateral corners for example in regions of the circumferential depression 115b of the rim well 115. The additional hollow space 10a saves considerable weight.

FIG. 3b shows an enlarged cross-section of the insert member 2 of the tire retaining device 1. The largest extension 30 in the axial direction 6 shows in a radially central region 21. The maximal axial width 30 is only slightly larger (in particular <10%) than the inner axial width 122 of the insert member in the region of the inwardly peripheral wall 3. The axial width of the insert member 2 in the axial direction 6 is in particular at least 50% larger than the maximal radial extension 24 or 25 of the insert member 2.

The insert member 2 shows an inwardly peripheral wall 3 and an outwardly peripheral wall 4 each showing wall thicknesses which are preferably less than 2 mm and in particular less than 1.5 mm. In preferred configurations, the wall thickness of the radial peripheral wall 3 and the radial peripheral wall 4 is about 1 mm (+/−20%). Preferably, the wall thicknesses of all the walls of the insert member 2 are substantially the same and/or differ from one another preferably by less than 50%.

In all the configurations, a sealant may be provided in the interior between the tire 114 and the rim well 115 and the rim flanges 116 for sealing small and minute tears and defects. The sealant may in particular be a sealing milk and preferably also seals any leaks occurring between the tire beads 118 and the rim flanges 116 so as to largely prevent pressure loss in the tire interior.

FIG. 4 shows the area of the valve 123 in which a recess 33 is configured in the insert member 2. Optionally, a valve opening 34 may be configured in the insert member 2 to ensure uniform air distribution in the tire.

All the configurations may use rim cross-sections other than those shown in FIG. 2.

Figure 5:
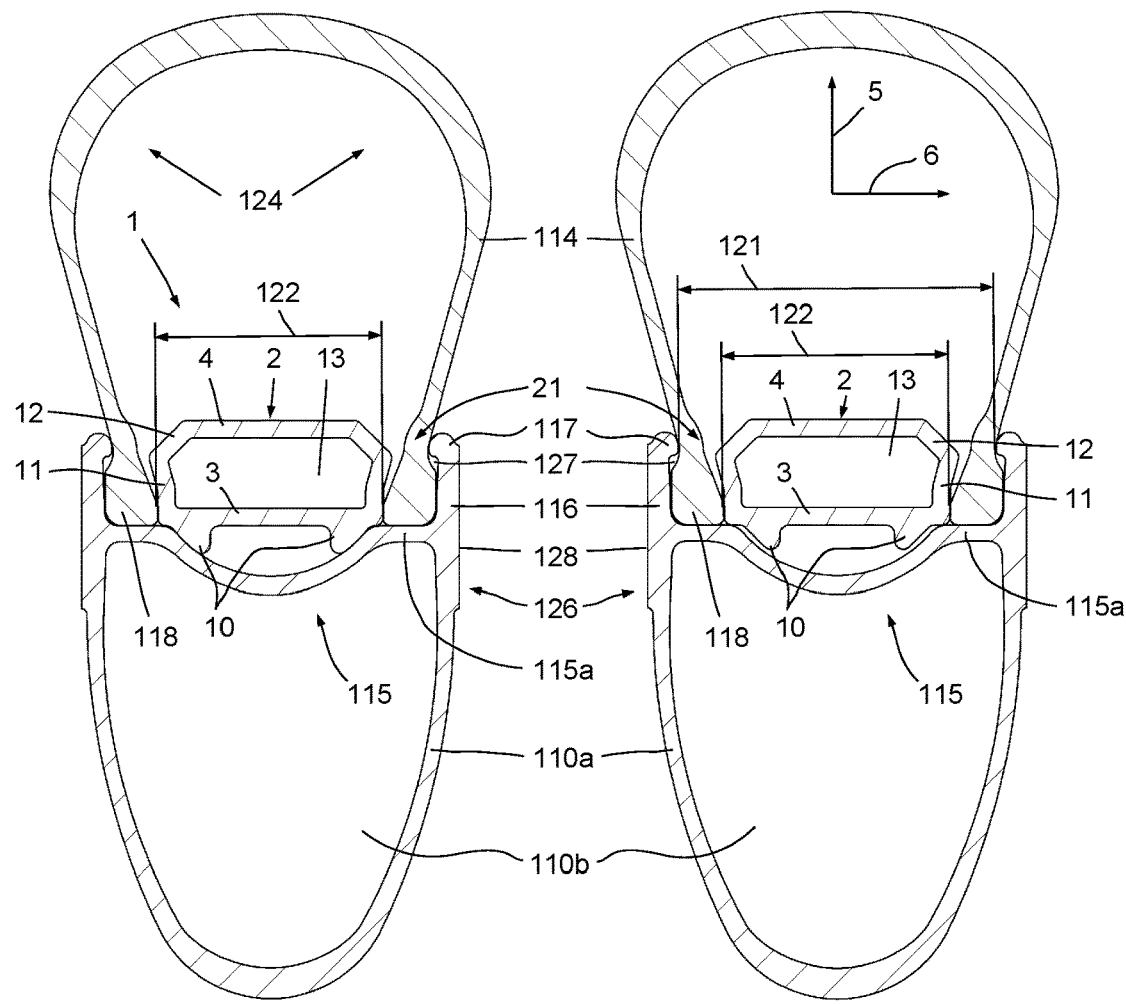
FIG. 5 two cross-sections of further wheels according to the invention.

FIG. 5 shows two similar cross-sections of further inventive wheels showing only minor differences. In the exemplary embodiment according to FIG. 5 the rim 110 may basically show the same rim body 110a as in the exemplary embodiment according to FIG. 2 and FIG. 3a. Also tire 114 may be the same as or similar to that used in the preceding exemplary embodiments.

The insert member 2 of the tire retaining device 1 differs from the insert member 2 of the tire retaining device 1 from FIG. 2 by way of providing, not one radially inwardly protruding support section 10 but two support sections 10. The support sections are each configured as circumferential lugs or the like and may optionally only be provided in portions of the circumference to save still more weight.

In the illustration on the left in FIG. 5 the lugs or support sections 10 of the insert member 2 bear against regions of the circumferential depression 115b. In contrast thereto, the right half of FIG. 5 illustrates a configuration showing slight gaps between the support sections 10 or the lugs and the pertaining regions of the rim well 115. Although these gaps may be structurally planned, they may only ensue in assembly.

Figure 6:
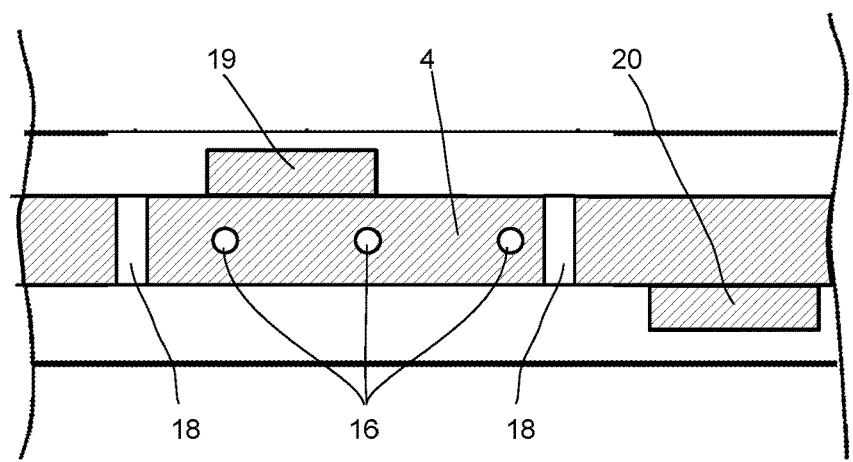
FIG. 6 a sectional plan view of conceivable wheel configurations according to the invention.

As the FIG. 6 shows, the insert member 2 may be provided with regular cuts 18 so as to create individual segments connected for example by a circumferential band. It is possible for evenly spaced apertures 16 to be configured for example in the outwardly peripheral wall 4 through which air may escape from the hollow space 13 in the interior of the insert member 2. Alternately, lateral additional blocks 19 and 20 may be provided.

On the whole, the invention provides advantageous wheels 101, 102 for sporty and also professional racing bicycles the rims 110 of which are equipped with rim flanges 116 and which are provided for use with tubeless tires or tires with tire beads. If considerable air pressure loss occurs in a wheel according to any of the exemplary embodiments according to FIG. 2, 3a or 5, then the tire compresses in the region of the contact area 119 so that the tire interior radially presses against the radially outwardly peripheral wall 4 of the insert member 2. This results in the fact that due to the angled structure of the side walls 11, 12 the side walls press against the tire beads 118.

If, due to the low internal pressure, a tire bead 118 begins to give way axially inwardly then the radially inwardly peripheral wall 3 exerts counterpressure against such axial displacement of a tire bead 118. This exerts considerable resistance to axial displacement of a tire bead 118 so as to enable sufficient traction for a cyclist on the racing bicycle during racing, so that he can (cautiously) continue riding until the service vehicle arrives for changing wheels or exchanging the entire bicycle. This achieves high reliability and high safety although the wall thickness 22 of the radially inwardly peripheral wall and the radially outwardly peripheral wall are thin, measuring less than ¼ or ⅙ or even less than ⅛ of the radial height of the insert member 2.

This is why racing bicycles for sports and in particular for semiprofessional and professional uses can be equipped with wheels 101, 102 according to the invention. Even in case of sudden pressure loss, the cyclist can continue riding for a certain distance of a few 100 or a few 1000 m and need not immediately stop and wait for the service truck.

The tire retaining device 1 according to the invention on the whole provides an advantageous option for equipping wheels 101, 102, having rims 110 with rim flanges 116 with so-called tubeless tires while still providing reliable emergency running properties. These emergency running properties make sense for example if considerable pressure loss occurs in the tire and the tire is to be prevented from detaching from the rim 110. A racing bicycle equipped with these wheels may be ridden even with a flat tire until the service truck arrives so as to minimize downtime in a cycling race.

While a particular embodiment of the present wheel with a tire retaining device for a racing bicycle has been described herein, it will be appreciated by those skilled in the art that changes and modifications may be made thereto without departing from the invention in its broader aspects and as set forth in the following claims.

LIST OF REFERENCE NUMERALS

1 tire retaining device
2 insert member
3 inwardly peripheral wall
4 outwardly peripheral wall
5 radial direction
6 axial direction
10 support section
10a hollow space
11 wall
12 wall
13 hollow space
16 opening
18 cut
19 additional block
20 additional block
21 center region
22 wall thickness
24 total height of 2
25 height of 2
30 width of 21
33 recess
34 valve opening
100 two-wheeled vehicle,
101 wheel, front wheel
102 wheel, rear wheel
103 frame
104 fork
106 handlebar
107 saddle
108 hub
109 spoke
110 rim
110a rim body
110b hollow space
111 brake disk
112 drive
114 tubeless tire
115 rim well
115a ring area, rim shoulder
115b circumferential depression
116 rim flange
117 outward bulge
118 tire bead
119 contact area
121 rim width
122 inner axial width
123 valve
124 air pressure force
125 height of rim flange
bicycle
126 rim flank
127 undercut
128 brake flank

The invention claimed is:

1. A wheel for an at least partially muscle-powered bicycle comprising:
   a rim with a rim body, said rim body includes a rim well having shoulders, and lateral rim flanks provided with rim flanges, the rim flanges showing bulges protruding inwardly, each of said rim flanges defining an undercut to the pertaining rim flange, wherein a tire having two circumferential tire beads is accommodated on said shoulders of said rim well of the rim body between the rim flanges, wherein the tire beads, when operational, bear against the inside of the rim flanges and enter the undercut at the bulges of the rim flanges;

wherein a tire retaining device is comprised and disposed in an internal space between the tire and the rim well; and the tire retaining device comprises an insert member configured with at least one hollow space that extends between the tire beads and comprises a radially outwardly peripheral wall and a radially inwardly peripheral wall, said radially inwardly peripheral wall being at a radial height that is equal to a radial height of said shoulders of said rim well, wherein at least the radially inwardly peripheral wall extends continuously over an inner axial width of the insert member, wherein at least one of the insert member and the hollow space, has a cross-section with a transverse extension in a radially central region that is larger than in a radially inner and a radially outer region, and wherein said insert member comprises a resilient material that compresses under pressure.

2. The wheel according to claim 1, wherein the insert member bears against at least one of the tire beads at least in spots.

3. The wheel according to claim 1, wherein the insert member extends radially outwardly beyond the rim flanges and wherein the insert member, when properly installed, extends radially outwardly by less than one fourth of its radial height beyond the rim flanges.

4. The wheel according to claim 1, wherein the insert member, when properly installed, radially protrudes less than 2 mm beyond the rim flanges.

5. The wheel according to claim 1, wherein the hollow space in the insert member, when the insert member is properly installed, radially protrudes less than 1 mm beyond the rim flanges.

6. The wheel according to claim 1, wherein the insert member comprises side walls which are oriented at angles at least in sections.

7. The wheel according to claim 1, wherein the radially outwardly peripheral wall of the insert member is substantially cylindrical.

8. The wheel according to claim 1, wherein the hollow space in the insert member comprises at least one-third of the insert member body volume and wherein at least a substantial part of the walls of the insert member shows a wall thickness of less than 2 mm.

9. The wheel according to claim 1, wherein the insert member cross-section profile is substantially rectangular.

10. The wheel according to claim 1, wherein the hollow space shows multiple outwardly openings.

11. The wheel according to claim 1, wherein the insert member comprises at least two hollow spaces.

12. The wheel according to claim 1, wherein the insert member comprises at least one support section toward the rim well.

13. The wheel according to claim 1, wherein the insert member shows a T-shaped cross-section at least in portions.

14. The wheel according to claim 1, wherein the tire is a tubeless tire and the rim is configured as a hollow rim, and wherein a width between the bulges is between 15 mm and 25 mm and a height of the rim flanges above the rim well is between 4 and 10 mm.

15. The wheel according to claim 1, wherein the insert member comprises a number of segments provided to be distributed over the circumference of a rim.

16. The wheel according to claim 1, wherein evenly spaced punched holes or cuts are configured in the insert member from radially outwardly or radially inwardly.

17. The wheel according to claim 1, wherein said radially inwardly peripheral wall of said insert member extends between and is directly adjacent to the tire beads of the tire.

18. The wheel according to claim 12, wherein said at least one support section is configured for centering by a circumferential groove in the rim well or by the rim well.

* * * * *